United States Patent [19]

Raschbichler

[11] Patent Number: 4,728,382
[45] Date of Patent: Mar. 1, 1988

[54] METHOD FOR THE CONTINUOUS PRODUCTION OF A LONG STATOR LINEAR MOTOR

[75] Inventor: Hans-Georg Raschbichler, Ottobrunn, Fed. Rep. of Germany

[73] Assignee: Thyssen Industrie Aktiengesellschaft, Essen, Fed. Rep. of Germany

[21] Appl. No.: 788,686

[22] Filed: Oct. 18, 1985

Related U.S. Application Data

[60] Continuation of Ser. No. 580,228, Feb. 15, 1984, abandoned, which is a continuation of Ser. No. 358,574, Mar. 16, 1982, abandoned, which is a division of Ser. No. 777,942, Sep. 19, 1985, Pat. No. 4,665,329.

[30] Foreign Application Priority Data

Mar. 17, 1981 [DE] Fed. Rep. of Germany ....... 3110339

[51] Int. Cl.$^4$ .............................................. B32B 31/00
[52] U.S. Cl. ..................... 156/264; 29/609; 156/267; 310/12
[58] Field of Search ................... 29/596, 609; 310/12, 310/13; 156/264, 267, 197; 238/8; 428/332

[56] References Cited

U.S. PATENT DOCUMENTS

| | | | |
|---|---|---|---|
| 3,006,798 | 10/1961 | Holland | 156/197 |
| 3,029,403 | 4/1962 | Krueger | 29/609 |
| 3,114,666 | 12/1963 | Johnson | 156/197 |
| 3,512,902 | 5/1970 | Emmons et al. | 29/596 |
| 3,834,013 | 9/1974 | Gerstle | 29/596 |
| 4,368,845 | 1/1983 | Perpy et al. | 238/8 |
| 4,381,334 | 4/1983 | Balk et al. | 428/332 |

FOREIGN PATENT DOCUMENTS 2462028 12/1975 Fed. Rep. of Germany.
2095044 1/1985 United Kingdom.

OTHER PUBLICATIONS

Coming Soon: The Death of Passenger Trains?, 1985, U.S. News & World Report, pp. 82,83.
Der Spiegel, 1985, pp. 41,43,45.

Primary Examiner—Jay H. Woo
Assistant Examiner—Timothy W. Heitbrink
Attorney, Agent, or Firm—Becker & Becker

[57] ABSTRACT

A lamination bundle or stack for a long-statorlinear motor. Each lamination is made of a thin, siliconized metal sheet for the electrical industry with a thickness of between 0.35 to 1.00 mm, and at one end of its narrow side has a recess, and at its opposite end has an extension corresponding to this recess for a positive or form-locking arrangement of the bundles in rows adjacent to each other. Of the teeth laterally defining the grooves for cable windings each end tooth has a width which corresponds to half the width of the adjacent tooth and at its free end is cut at an incline, whereby the inclined cutting line extends from the groove to the end of the narrow side. The laminations are stacked so as to completely cover each other, and have their contacting surfaces glued together over the entire surface area thereof. According to the method of producing the laminated bundle, a thin strip of sheet metal for the electrical industry, coated on both sides with a duroplastic adhesive and unwound from a drum, is fed by a feeding or advancing device to a punch; thereupon, these laminations are punched out from the metal sheet, are subsequently stacked upon each other in a magazine, and are adhesively joined with each other into a bundle or packet; thereafter, the laminated bundle of laminations is first conveyed through different thermal treatment zones arranged one after the other, and is subsequently supplied to a device for coating the bundle of laminations with a corrosion protective layer.

3 Claims, 6 Drawing Figures

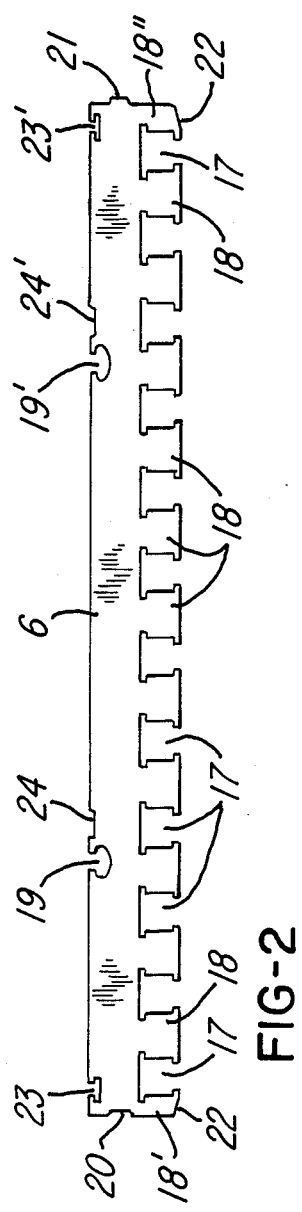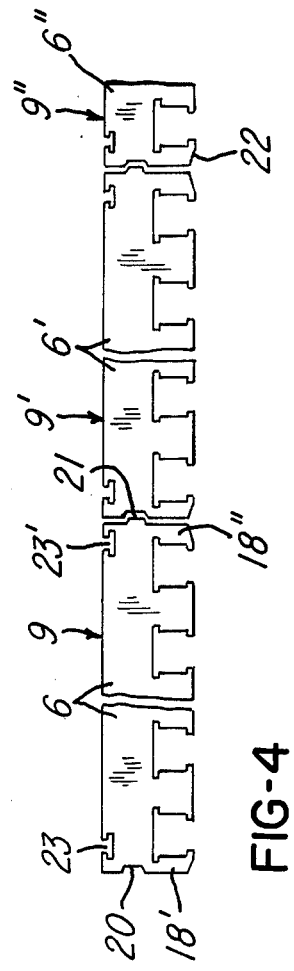

METHOD FOR THE CONTINUOUS PRODUCTION OF A LONG STATOR LINEAR MOTOR

This is a continuation application based upon copending U.S. patent application Ser. No. 580,228 Raschbichler filed Feb. 15, 1984 now abandoned, which is a continuation of original U.S. patent application Ser. No. 358,574-Raschbichler filed Mar. 16, 1982, now abandoned, for which a co-pending divisional application Ser. No. 777,942-Raschbichler filed Sept. 19, 1985, has matured into U.S. Pat. No. 4,665,329-Raschbichler dated May 12, 1987.

The present invention relates to a bundle or packet of laminations for a long-stator-linear motor, especially on a magnetic track for the long-stator magnetic drive industry, and comprises individual identically profiled and stacked strip-like laminations. The laminations are provided on one longitudinal side, in alternating sequence and in identical spacing relative to each other, with specially shaped grooves for receiving a three-phase cable winding and with teeth; the other longitudinal side is provided with special recesses for fastening on a track or roadway support; the laminations are additionally insulated with respect to each other, and are rigidly connected to each other.

The active motor part (primary part) of magnetic tracks in the long-stator magnetic drive industry is installed in the track or roadway as a bundle of laminations having three-phase cable winding. The lamination bundles as the stator part, are installed along the track or roadway support, and must perform several tasks. This means that a considerable portion of the roadway investment for such magnetic tracks depends on the embodiment and costs of the bundles of laminations.

The different functions to be performed by the bundles of laminations can arise simultaneously or separately. For example, the bundle of laminations is relied upon for the magnetic flux guidance for the long-stator-linear motor, for the magnetic support of the vehicle, and, during certain breakdown situations, as a mechanical emergency gliding surface for the support magnets.

A comparison with the state of the art is unsatisfactory because lamination bundles as stator part of a motor previously did not have to fulfill conditions of this type.

A similar lamination bundle can be found, for example, in German Offenlegungsschrift No. 24 62 028. The individual sheets of laminations are here provided with punched holes into which connection elements, as for example screws, are inserted for mechanically holding together the laminations joined into a packet or bundle.

The sheet metal laminations loosely contacting each other and shiftable uncontrollably relative to each other must be accurately aligned for producing this lamination bundle in order to assure that the punched holes for the connecting screws are in alignment. In case an additional gluing together was undertaken, great technical effort and cost are required to keep the holes in the lamination bundle free of adhesive. In most cases a later removal of adhesive from the holes is necessary before the insertion of the connecting screws can be undertaken. Only after the removal of the adhesive from the holes can the connecting screws be inserted into the holes in a separate working step, and the sheet metal laminations can be braced against each other to form a bundle by means of these screws.

Drawbacks of this known embodiment include the great work effort and costs at the individual working stations, and the thus resulting reduction in the production speed or the limitation of the automatization of the production process. Additionally, relatively high costs result as a consequence of the large number of connecting screws, which of course must additionally be permanently insulated relative to the laminations to avoid any short circuits between the laminations. Furthermore, considerable difficulties result with this bundle of laminations upon application of higher operating frequencies of the long-stator-motor (up to 250 Hz), which are an absolute necessity for a high speed magnetic rail system.

The connecting screws, which brace the sheet metal laminations against each other and are located in the flus-transmitting zone, cause not inconsiderable losses in the efficiency of the long-stator-motor. Additionally, the magnetic flux transmission for the support function of the magnetically suspended vehicle is interfered with by these screws. In addition, it is to be noted that due to the finite spacing of the screw connections over the length of the bundle of laminations, clamping forces are generated which are effective only over point-like areas and which do not assure the necessary mechanical strength characteristics, for instance during emergency guidance of a support magnet. Furthermore, this point-like clamping connection results in gaps between the individual laminations which gaps can take up moisture or other media by capillary action and can lead to corrosion in the interior of the lamination bundle and of the connecting screws.

Further disadvantages exist with sheet metal packets (lamination bundles) arranged along the track or roadway support in that, at the transition area of two sheet metal packets (lamination bundles) which adjoin each other, the prescribed spacing of the grooves for receiving the cable windings is not always assured, and in that height or side differences can result. These differences are disadvantageously felt when the vehicle passes by.

Since the sheet metal laminations cut out by a stamping process have a stamping burr, and since these burrs, when clamping together the lamination packet by means of screws, can come to lie upon each other at least partially, during operation of the lamination packet settlement phenomena can occur caused by electromagnetic or mechanical forces and vibrations, which lead to a partial or complete loss of initial stressing of the screw bolts. In this situation, the the lamination packet is no longer in a position to fulfill its electromagnetic and mechanical functions, i.e. the laminations shift relative to each other in an uncontrolled manner.

It is therefore an object of the present invention to provide a bundle of laminations for a long-stator-motor of the type described above which at all times assures the elctrical, magnetic, and mechanical functions of the long-stator-magnetic drive industry.

It is another object of this invention to provide a method with which a high production speed and complete automation is attained, so that a desired economical production is realized.

These objects, and other objects and advantages of the present invention, will appear more clearly from the following specification in connection with the accompanying drawings, in which:

FIG. 2 is a plan view of a sheet of laminations;

FIG. 4 shows several bundles of laminations arranged in a row;

Figure 1:
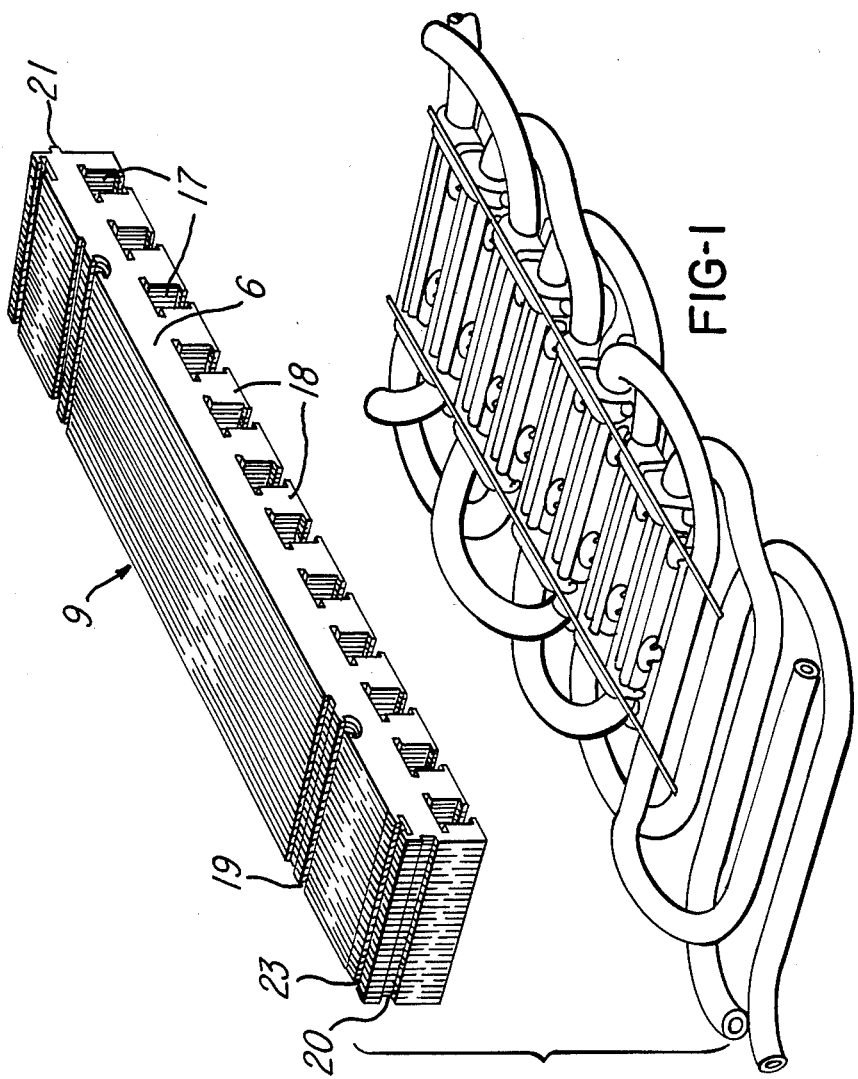
FIG. 1 is a schematic illustration, in a perspective exploded view, of one embodiment of the bundle of laminations according to the present invention, with meander-like three-phase cable winding.
Figure 3:
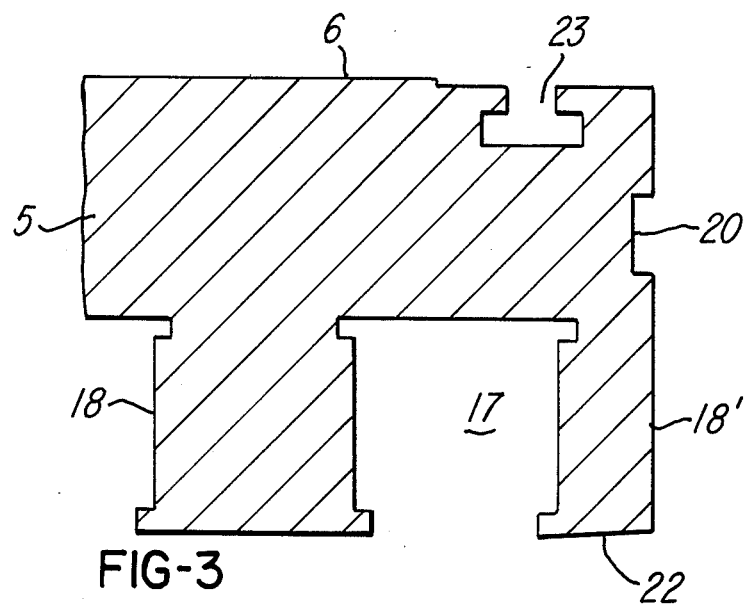
FIG. 3 shows an end section of a sheet of lamination on an enlarged scale with an applied prehardened reaction adhesive.
Figure 5:
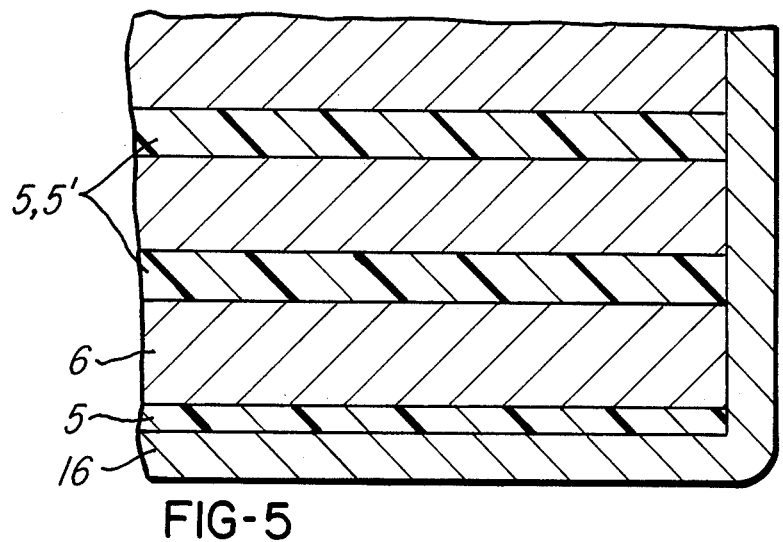
FIG. 5 shows on an enlarged scale part of a cross section of a laminated, adhered or glued bundle of laminations having a corrosion-protective coating.

The inventive bundle of laminations is characterized primarily:

(a) in that each lamination comprises a thin siliconized sheet of metal for the electrical industry with a thickness of from 0.35 to 1.00 mm, and at one end of its narrow side has a recess and at its opposite end has an extension corresponding to this recess for a positive or form-locking arrangement of the bundles in rows adjacent to each other;

(b) in that of the teeth of a lamination laterally defining the grooves, each end tooth has a width which corresponds to half the width of an adjacent tooth and at its free end is cut at an incline, whereby the slanted cutting line extends at an incline from the groove to the end of the narrow side; and (c) in that the laminations are placed upon each other so as to completely cover each other, i.e. are congruent in shape, and have their respective contacting surfaces glued together over the entire surface area thereof.

According to further specific embodiments of the present invention, each sheet of lamination may have cutouts on that longitudinal side which is provided with recesses for fastening on the roadway or track support, with such cutouts being provided to compensate for curvature or arcuateness resulting when stamping the sheet metal laminations.

Each sheet metal lamination may be coated on both sides with a duroplastic, prehardened adhesive which has a layer thickness of from 5 to 8 $\mu$m, simultaneously effects insulation and cohesion of the stacked sheet metal laminations, and ensures the mechanical strength or rigidity of the laminated bundle of laminations.

That longitudinal side of the bundle of laminations which is provided with the recesses for fastening on the track or roadway, may be provided at each of its ends with a cutout having an approximately T-shape and suitable for a connecting element to the adjacent bundle of laminations. The bundle of laminations may be provided on all sides with a corrosion protective coating.

The inventive method for making such a laminated bundle of lamination is characterized primarily in that a thin strip of sheet metal for the electrical industry, coated on both sides with a duroplastic adhesive and unwound from a drum, is fed by means of a feeding or advancing device to a punch; thereupon these laminations are punched out from the metal sheet, are subsequently stacked upon each other in a magazine, and are glued or adhesively joined with each other to form a packet or bundle of laminations. Thereafter, the laminated bundle of laminations is first conveyed through different thermal treatment zones arranged one after the other, and subsequently is supplied to a device for coating the bundle of laminations with a corrosion protective layer.

The bundle of laminations may be cured or hardened in the thermal treatment zones by heating in a continuous-heating furnace or by means of inductive heating, and may subsequently be cooled off.

A curable or hardenable epoxy resin compound may be applied as the corrosion protective coating to the bundle of laminations by means of an electrostatic lacquering method; the residual heat remaining in the bundle of laminations after the curing or hardening process may be used for curing or hardening of the corrosion protective coating.

Figure 6:
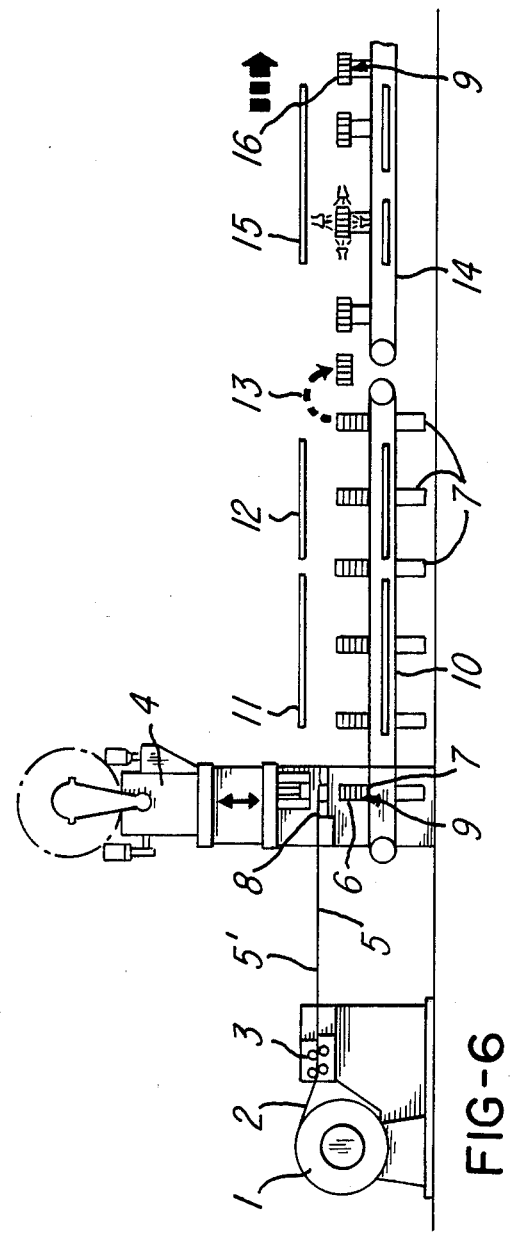
FIG. 6 schematically illustrates a manufacturing plant for continuously producing the bundle of laminations.

Referring now to the drawings in detail, with the exemplary manufacturing plant illustrated in FIG. 6, from a drum 1 there is supplied a wound-up thin strip 2 of a metal sheet for the electrical industry that is automatically fed to a punch 4 by means of an aligning and feeding device 3.

The strip 2, which comprises a siliconized metal sheet for the electrical industry, has a thickness of between 0.35 mm to 1.00 mm, and is coated on both sides with a prehardened duroplastic adhesive 5, 5'. The width of the sheet metal strip corresponds approximately to the length of the bundle of laminations or stack of sheets to be produced.

In the punch 4, laminations 6 are cut out from the sheet metal strip. These laminations 6 drop into a magazine 7 arranged below the cutting plane, and are there either counted or weighed and, after being aligned, are stacked to form a packet or bundle 9. A compound tool 8 can serve for stamping out the sheets of laminations. In this tool 8, the sheet metal strips are not only transported further, but the laminations are also stamped out in a sequential die process, by a special low-waste matrix or stamping mold, with a nested or jig-saw cut. The bundle of laminations, consisting for instance of 360 laminations 6 stacked upon each other, is first conveyed by means of a conveyor 10 through a hardening or tempering zone 11, and subseqently through a cooling-off zone 12. By heating to approximately 230° C., the individual laminations coated with the prehardened adhesive are under pressure in the magazine 7 glued together into a packet or bundle of laminations 9. At the end of the conveyor 10, and after the cooling-off zone 12, the laminated glued together packet of lamination is taken from the magazine 7 by means of a removal device 13 (not illustrated in detail), is then pivoted into a different position, and is placed upon a further conveyor 14. The bundle located on this conveyor 14 is supplied to a device 15 in which the entire lamination packet is provided with a corrosion protective coating 16 of hardenable epoxy resin by means of, for instance, an electrostatic process. The residual heat of approximately 100° C. still remaining in the lamination bundle is hereby used for curing or hardening the epoxy resin coating. The method according to the present invention accordingly requires only a single curing or hardening step.

The high strength of the lamination connections with the adhesive, which is necessary for the mechanical function of the lamination bundle, is attained through the brief heating-up in the curing or hardening zone 11. Due to the use of an already prehardened adhesive, only very little energy is needed for effecting the connection of the laminations. Additionally, short curing or hardening times are attained, and a synchronization with the punching and stacking process is realized, so that no additional production times are necessary for these steps.

Due to the special coating of the electro-sheet metal strip with the reaction adhesive prior to the stamping process, the additional advantage of a longer service life of the cutting tools ("lubricating characteristic" of the adhesive) can be attained.

Further advantages result from using the jig-saw cut during the stamping of the sheet metal laminations; with this kind of cut, the cut-out profiles for the grooves of one lamination form at the same time the teeth of the adjoining lamination, and vice versa. This nesting or jig-saw configuration of the cut results in a minimum of sheet metal waste, whereby in turn considerable cost reduction is attained.

Each thus produced strip-shaped sheet metal lamination 6 used for building-up the bundle of laminations 9 is provided on one longitudinal side with grooves 17 for receiving cable windings, and with teeth 18, the grooves and the teeth being arranged in alternate sequence and equal spacing relative to each other; the other oppositely located longitudinal side of the lamination is provided with recesses 19 for fastening on the track or roadway support. Additionally, the sheet metal lamination 6 has both ends of its narrow sides shaped in such a way that a positive connection of adjacent packets 6 can be realized; for this purpose, one end is provided with a recess 20, and the other end is provided with an extension 21 corresponding to this recess 20. The end faces of each bundle of laminations are thus provided either with a groove or a tongue which assures a positive clamping together of the individual bundles of laminations placed in the track or roadway, and simultaneously effects a force distribution, during eventual approach of the carrier or support magnet, from one stator bundle onto another.

An electromagnetically disadvantageous contact of the stamping burrs, caused by the adhesive exuding along the lamination edges, is avoided due to the surface-adhesion of the sheet metal laminations with each other. Furthermore, no settlement phenomena can occur in the sheet metal bundle of laminations when mechanical forces or vibrations are encountered.

So that no breakdowns or operating disturbances can occur at the transition zone of two bundles 9 and 9' or 9" arranged adjacent to each other, and so that the groove spacing is assured, the end teeth 18' and 18" of each lamination 6, and hence of each bundle of laminations, are embodied in a special way. This special embodiment consists therein that each end tooth 18', 18" is only half as wide as the adjoining teeth 18, and at its free end is cut at an angle or in such a manner that the cutting line is slanted from the groove 17 toward the end of the narrow side of the lamination, and hence toward the end face of the bundle of laminations. A hooking together of the carrier or support magnet and the long-stator-bundle of laminations is prevented during mechanical emergency guidance through the slanting cut at the head of the end teeth 18', 18". That longitudinal side of the sheet metal lamination 6 or of the bundle of laminations 9 which is opposite the grooves 17 is provided at both of its end sections with a respective cutout 23, 23' which preferably is T-shaped and serves for receiving a connecting element to the adjoining bundle of laminations 9' or 9". Additionally, at least one cutout or recess 24, 24' is located on this longitudinal side of the lamination, for example in the vicinity of the recesses 19, 19'; this cutout or recess 24, 24' is provided for equalizing the "arcuateness" deformation which occurs when punching out the grooves 17.

The present invention is, of course, in no way restricted to the specific disclosure of the specification and drawings, but also encompasses any modifications within the scope of the appended claims.

What I claim is:

1. In a method of producing a bundle of laminations for a long-stator linear motor exclusively operable at higher operating frequencies up to 250 Hz as absolutely necessary for a high speed magnetic propulsion rail system including a magnetic suspension vehicle and support magnets, the improvements in combination therewith comprising the steps of:

unwinding from a drum a thin sheet of metal being coated on both sides with thermosetting adhesive material prehardened in a layer thickness ranging from 5 to 8 μm simultaneously effecting insulation and cohesion of said sheet metal therewith to ensure mechanical strength and rigidity;

feeding said sheet to a punch;

first punching from said metal sheet a configuration of laminations substantially free of waste prior to any stacking thereof, said laminations including teeth interspaced with cut-out grooves to subsequently receive therein a three-phase cable winding in combination therewith;

then stacking said laminations one on top of another in such a way as to completely cover each other to avoid point-like clamping connections otherwise resulting in gaps between individual laminations, whereby said gaps can take up moisture and other media by capillary action and can lead to corrosion in the interior thereof;

adhesively joining said stacked laminations adhering to each other to form a bundle of laminations particularly for electromagnetic propulsion of the magnetic suspension vehicle as well as for electro-mechanical support and guiding of the magnetic suspension vehicle for the high speed magnetic propulsion rail system;

thereafter conveying said bundle of laminations through different thermal treatment zones arranged one after the other; and finally further coating said thermally treated bundle with a corrosion resistant protective plastic layer of epoxy resin compound hardenable by an additional step of curing thereby forming a self-supporting bundle of laminations exclusively for the high speed magnetic-propulsion rail system with which the bundle of laminations per se without any housing is relied upon for magnetic flux guidance in operation as a long-stator linear motor, for magnetic supporting of rail vehicles and during breakdown situations as a mechanical emergency gliding surface for the support magnets;

said conveying of said bundle of laiminations through different thermal treatment zones for hardening includes sequentially heating said bundle and curing same as well as leaving a residual heat remaining in said bundle of laminations after said curing, and subsequently cooling off said bundle of laminations;

said finally further coating including electrostatically applying a hardenable epoxy resin compound on said bundle of laminations for lacquering thereof as said corrosion resistant protective layer, and purposely only using the residual heat remaining in said bundle of laminations after said curing step for thereby curing and hardening said corrosion protective layer therewith.

2. The method according to claim 1, further including the steps of: hardening the stacked laminations in the heat treatment zones by heating in a continuous furnace.

3. The method according to claim 1, further including the steps of: hardening the stacked laminations in the heat treatment zones by means of inductive heating and then cooling the hardened laminated sheet pack as the self-supporting unit.

* * * * *